United States Patent [19]

Wright

[11] 3,999,586
[45] Dec. 28, 1976

[54] REINFORCING BELT FOR A PNEUMATIC TIRE

[75] Inventor: Charles R. Wright, Akron, Ohio

[73] Assignee: The General Tire & Rubber Company, Akron, Ohio

[22] Filed: Apr. 18, 1974

[21] Appl. No.: 462,019

[52] U.S. Cl. .................... 152/361 R; 152/361 DM
[51] Int. Cl.² .......................................... B60C 9/18
[58] Field of Search ... 152/361 R, 361 FP, 361 DM, 152/352; 139/383, 384

[56] References Cited

UNITED STATES PATENTS

| 1,227,427 | 5/1917 | Grabau et al. | 427/171 |
| 1,285,084 | 11/1918 | Evans | 152/361 R |
| 3,503,432 | 3/1970 | Maiocchi | 152/361 DM |
| 3,720,570 | 3/1973 | Greene et al. | 152/361 R |
| 3,785,423 | 1/1974 | Bourcier de Carbon | 152/361 R |

FOREIGN PATENTS OR APPLICATIONS 610,167  12/1960  Canada .............................. 152/361

Primary Examiner—Drayton E. Hoffman

[57] ABSTRACT

A reinforcing belt for a pneumatic tire has at least two elastomeric bands positioned adjacent and substantially parallel to each other and adapted to extend substantially parallel to the circumferential centerline of the pneumatic tire. Interleaved with the elastomeric bands is a plurality of elastomeric strips positioned adjacent and substantially parallel to each other, with adjacent strips contacting opposite sides of each band. Each strip and band contains a plurality of reinforcing cords extending substantially parallel to each other. The reinforcing cords of the bands are also adapted to extend substantially parallel to the circumferential centerline of the pneumatic tire, and the reinforcing cords of the strips are adapted to extend angularly to the circumferential centerline of the pneumatic tire.

1 Claim, 6 Drawing Figures

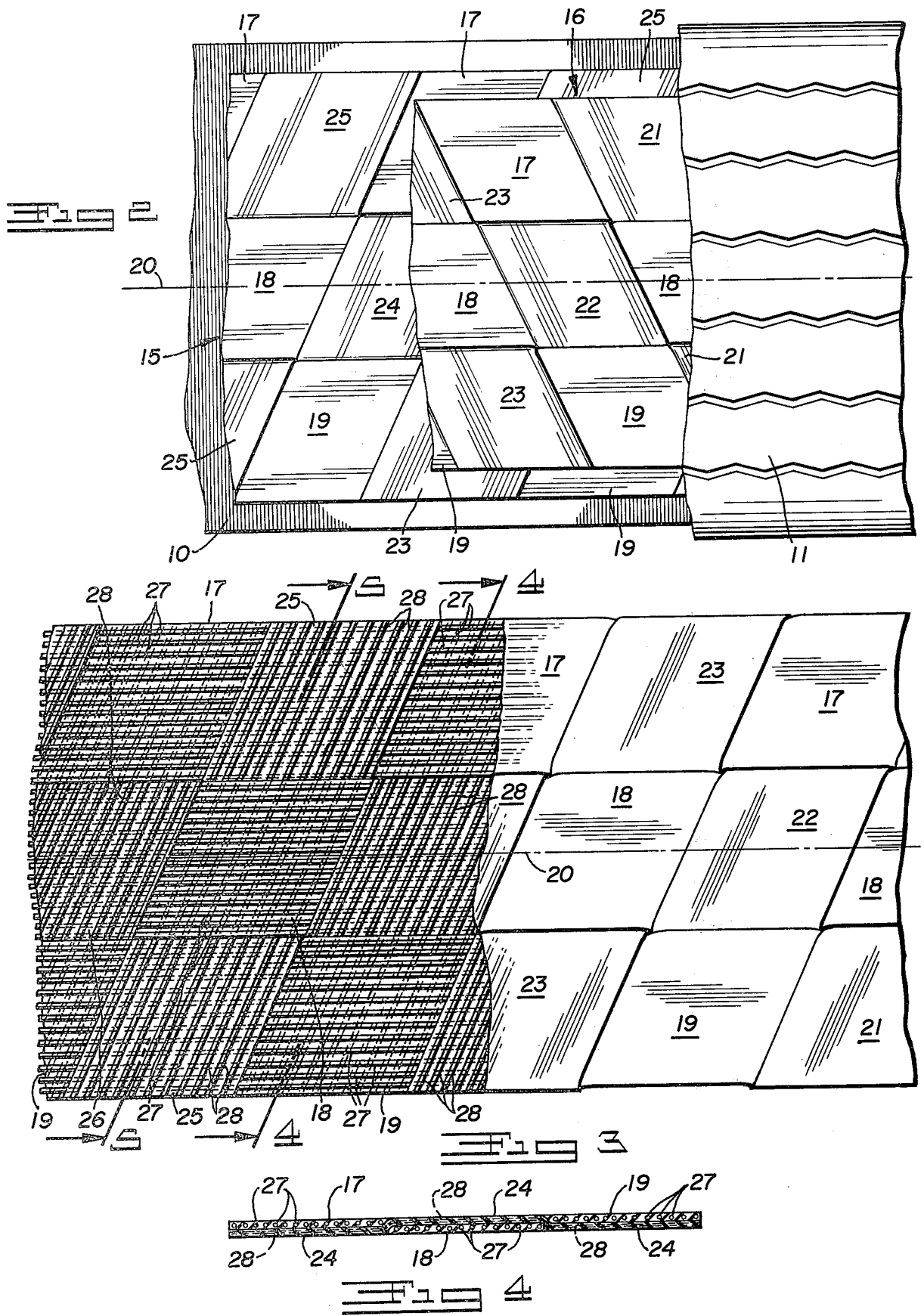

REINFORCING BELT FOR A PNEUMATIC TIRE

FIELD OF THE INVENTION

The present invention relates to pneumatic tires, and particularly belts utilized in reinforcing pneumatic tires.

BACKGROUND OF THE INVENTION

In the construction of pneumatic tires, annular belt or belts (called "breakers") have been generally included about the circumference of the tire between the tire carcass body and the tread. Such belts provide better road stability and longer tread life in both radial and bias ply tires.

Even with such belts or breakers, there has been a continuing need for a stronger, more durable, more wear-resistant, lighter weight pneumatic tire. One of the approaches used in the past to increase durability and wear resistance, while reducing weight, has been to vary the weave and composition of the reinforcing threads and cords of the plys. Various illustrations of this approach are set forth in U.S. Pat. Nos. 688,319, 1,423,771, 2,083,003, 2,906,314, 3,481,386, 3,568,749 and 3,682,222.

Generally such reinforcements utilize cords and wires coated with or impregnated in suitable elastomeric material such as natural or synthetic rubber. For radial ply tires, inextensible belts with such cords disposed in the direction of the longitudinal axis of the belt can be readily made by calendaring woven fabric with an unvulcanized rubber. However, the cords are usually disposed in a bias pattern in which portions thereof extend in different directions to each other and generally in directions biased with respect to the longitudinal axis of the reinforcement. This pattern is usually provided by cutting on a bias woven fabric which has been calendared with a layer of unvulcanized rubber, and thereafter splicing the cut strips edge to edge.

Another approach to the problem of increasing durability and wear resistance, while reducing weight, has been to interleave strips or plys of rubber coated or impregnated reinforcing material to form bands or belts for use in the carcass or breaker of the pneumatic tire. Illustrative of the different disclosures directed to this approach are set forth in U.S. Pat. Nos. 574,438, 1,017,271, 1,132,634, 1,233,420, 3,024,829 and 3,770,042. Of this approach, it has been general knowledge that the strips must be biased to the circumference of the tire to allow inflation to the desired tension, and to provide sufficient flexibility that the tire will readily yield to the various surfaces encountered during use without substantial heat generation.

The present invention goes contrary to those teachings of the prior art. Surprisingly, the present invention provides a highly durable and wear resistant tire of light weight by incorporating a breaker belt formed of circumferential bands interleaved with angularly disposed strips.

SUMMARY OF THE INVENTION

A reinforcing belt is provided for use in construction of a pneumatic tire which increases the durability and wear resistance of the tire while reducing the weight of the tire. The reinforcing belt is particularly useful in truck tires and off-the-highway tires where puncture resistance is of prime importance. The reinforcing belts of the present invention also sufficiently increase the strength in some embodiments that the number of plys and weight of the carcass of the pneumatic tire can be substantially reduced.

Generaly, the reinforcing belt of the present invention is comprised of at least two and typically three elastomeric bands positioned substantially parallel to each other along the longitudinal axis of the reinforcing belt. The bands are thereby adapted to extend, on assembly in the pneumatic tire, substantially parallel to the circumferential centerline of the tire about the entire circumference of the tire carcass. Each band contains a plurality of reinforcing cords that extend substantially parallel to each other along the longitudinal axis of the reinforcing belt. The cords are thus adapted to extend, on assembly, substantially parallel to the circumferential centerline of the pneumatic tire.

The reinforcing belt also includes a plurality of elastomeric strips interleaved with the elastomeric bands adjacent and substantially parallel to each other. The elastomeric strips are so interleaved that adjacent strips contact opposite sides of each band. Each strip contains a plurality of reinforcing cords that extend substantially parallel to each other and angular to the longitudinal axis of the reinforcing belt.

Although the reinforcing belt of the present invention may be utilized in both bias ply and radial ply tires, the invention has been found to be particularly useful with heavy duty radial ply tires, e.g. truck tires and off-the-highway tires. In any case, the strips of the reinforcing belts are preferably positioned to extend at an acute angle or substantially perpendicular to the longitudinal axis of the reinforcing belt; the strips are thereby adapted to extend at either an acute angle or substantially perpendicular to the circumferential centerline of the pneumatic tire on assembly.

Where the strips extend at an acute angle, the reinforcing belts of the present invention are preferably assembled in pairs in juxtaposition with the strips of each belt of the pair extending at equal but opposite angles from the circumferential centerline. By this arrangement, the force variations caused by each belt are substantially offset by the force variations caused by the other reinforcing belt of the pair.

Alternatively, where the strips extend substantially perpendicular to the circumferential centerline, the reinforcing belts of the present invention may be utilized singularly in the construction of the pneumatic tire and in turn further reduce the weight of the tire.

Other details, objects and advantages of the invention will become apparent as the following description of the presently preferred embodiments and presently preferred methods for practicing the same proceeds.

BRIEF DESCRIPTION OF THE DRAWINGS

In the accompanying drawings, the preferred embodiments of the invention and presently preferred methods of practicing the invention are illustrated in which:

FIG. 2 is a top view with portions broken away of the fragment of the pneumatic tire shown in FIG. 1;

FIG. 3 is a top view with portions broken away of a reinforcing belt of the present invention as shown in FIGS. 1 and 2;

FIG. 4 is a cross-sectional view taken along the line IV—IV of FIG. 3;

DESCRIPTION OF THE PREFERRED EMBODIMENTS

Figure 1:
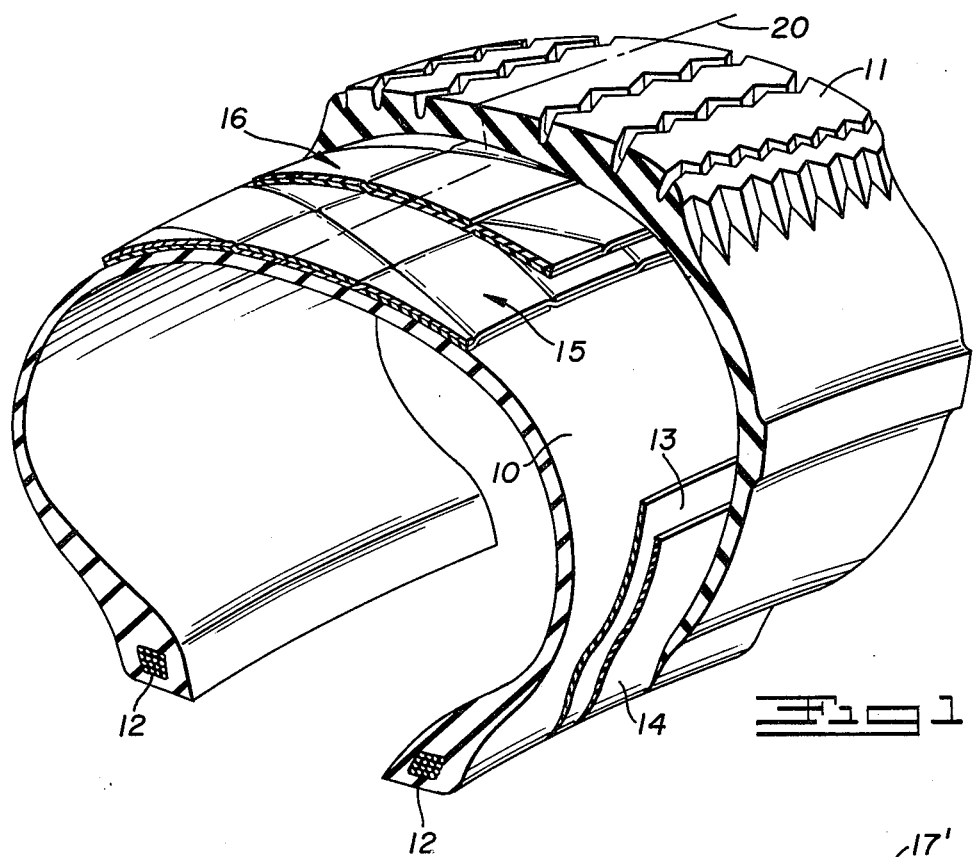
FIG. 1 is a perspective view with portions broken away of a fragment of a pneumatic tire showing the reinforcing belts of the present invention in assembly.

Referring to FIG. 1, a pneumatic tire is shown having carcass 10 and tread 11. Carcass 10 is preferably built of radial plys by known commercial techniques, incorporating beads 12. Carcass 10 also includes sidewall plys 13 and 14 applied to both sidewalls of the carcass adjacent beads 12.

Positioned between carcass 10 and tread 11 are reinforcing belts 15 and 16 of the present invention. As best shown in FIGS. 2 and 3, each reinforcing belt 15 and 16 is comprised of three elastomeric bands 17, 18 and 19 positioned adjacent and substantially parallel to each other and adapted to extend the circumference of the pneumatic tire substantially parallel to the circumferential centerline 20 of the pneumatic tire on assembly. Preferably, belts 15 and 16 are positioned symmetrically about the circumferential centerline of the tire.

The bands 17, 18 and 19 are interleaved with a plurality of elastomeric strips 21, 22, 23, 24, 25, and 26, etc. positioned adjacent and substantially parallel to each other, adaptably around the circumference of the pneumatic tire. The strips are interleaved so that adjacent strips, e.g. 21 and 22, or 23 and 24, contact opposite sides of each band 17, 18 and 19. In this way, each strip contacts the same side of the outer two bands 17 and 19 and the opposite side of the middle band 18.

The elastomeric strips and bands are typically textile or metal fabrics as shown in FIG. 3, coated or impregnated with unvulcanized rubber. The strips and bands preferably vary in thickness between about 0.020 and 0.100 inch.

The width of the bands and the strips will vary with the size of the tire. The bands are preferably greater than ½ inch in width and may be as great as 8 inches, or more, in width for giant off-the-highway tires. For truck tires, the width of the bands 17, 18 and 19 will vary usually between 1 and 3 inches, with roughly 2 inches being most typical. Preferably 21, 22, 23, 24, 25, 26, etc. are also greater than ½ inch and may vary up to 8 inches, or more, for off-the-highway giant tires. The strips will also vary usually between 1 and 3 inches, with roughly 2 inches being most typical, for truck tires.

Each strip and band contains a plurality of reinforcing cords extending substantially parallel to each other. The cords 27 of the bands 17, 18 and 19 also extend along the longitudinal axis of the reinforcing belt and are thus adapted to extend substantially parallel to the circumferential centerline 20 of the pneumatic tire on assembly. Cords 28 of strips 21, 22, 23, 24, 25, 26, etc. are also positioned to extend angularly to the longitudinal axis of the reinforcing belt and are thus adapted to extend angularly to the circumferential centerline 20 of the pneumatic tire on assembly (as shown in FIG. 1). Preferably, the latter is accomplished by extending the cords 28 of the rubberized stock for the strips along the longitudinal axis thereof, cutting the strips therefrom on a bias, and positioning the strips at an acute angle, e.g. 30°, to the longitudinal axis of the reinforcing belt.

In assembly in pneumatic tires shown in FIG. 1, the reinforcing belts of the present invention are provided in pairs, with the strips of the belts of each pair positioned at equal but opposite angles from the circumferential centerline of the tire. This pairing of the reinforcing belts provides for a balancing of the variations produced by the resulting tire and in turn greater road stability and better riding characteristics.

Figure 6:
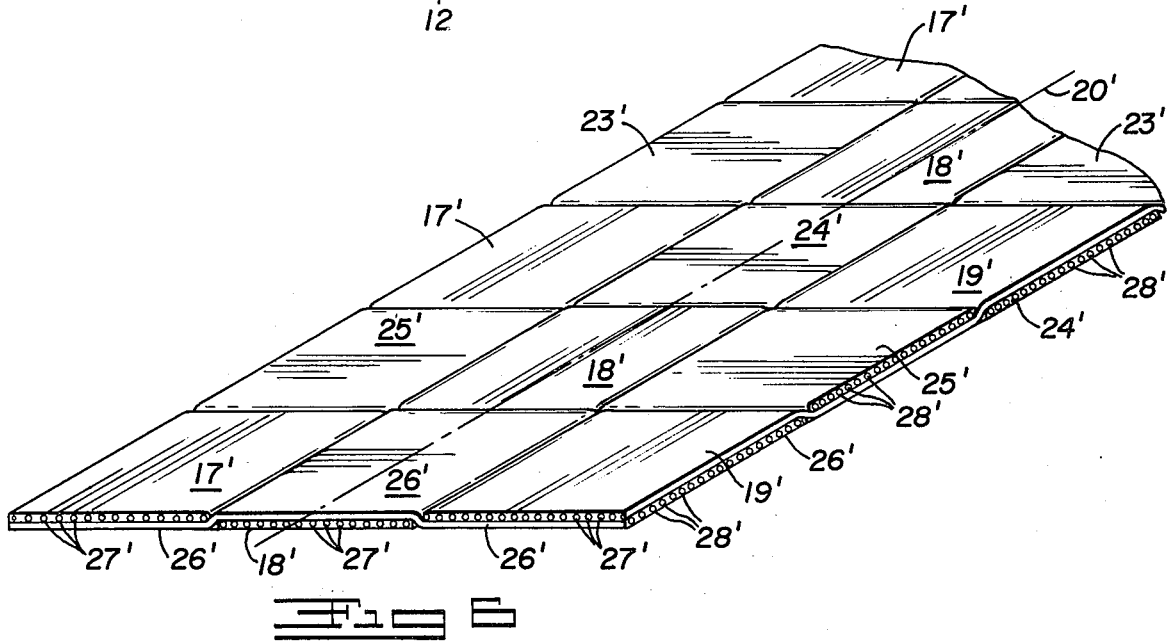
FIG. 6 is a perspective view of an alternative reinforcing belt of the present invention.
Figure 5:
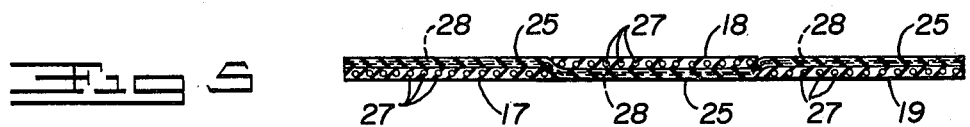
FIG. 5 is a cross-sectional view taken along the line V—V of FIG. 4.

Referring to FIG. 6, an alternative reinforcing belt embodying the present invention is shown. The construction is the same as previously described for reinforcing belts 15 and 16 except for the positioning of the strips 21', 22', 23', 24', 25', 26', etc. Instead of being positioned at an acute angle to the longitudinal axis of the reinforcing belt, the strips are positioned substantially perpendicular to the longitudinal axis of the reinforcing belt and are thereby adapted to extend substantially perpendicular to the circumferential centerline 20' of the pneumatic tire on assembly.

While presently preferred embodiments have been shown and described with particularity, it is distinctly understood that the invention may be otherwise variously performed and embodied within the scope of the following claims.

What is claimed is:

1. Two reinforcing belts positioned only under the tread portion of a pneumatic radial tire each belt comprising:
   a. at least two elastomeric bands positioned adjacent and parallel to each other and extending parallel to the circumferential centerline of the pneumatic tire, each said band consisting essentially of a flat elastomeric material containing a plurality of reinforcing cords extending parallel to each other and parallel to the circumferential centerline of the pneumatic tire; and
   b. a plurality of elastomeric strips positioned adjacent and parallel to each other and interleaved with said elastomeric bands and with adjacent strips contacting opposite sides of each adjacent band, each strip consisting essentially of a flat elastomeric material containing a plurality of reinforcing cords extending parallel to each other and at an acute angle to the circumferential centerline of the pneumatic tire.

The two belts being positioned so that the acute angle of the strips of each belt are oppositely disposed to the acute angle of the strips of the other belt and so that one belt lies above the other.

* * * * *